June 6, 1961  W. R. TESON ET AL  2,987,292
MECHANICALLY OPERATED COLLAPSIBLE VALVE
Filed July 13, 1959
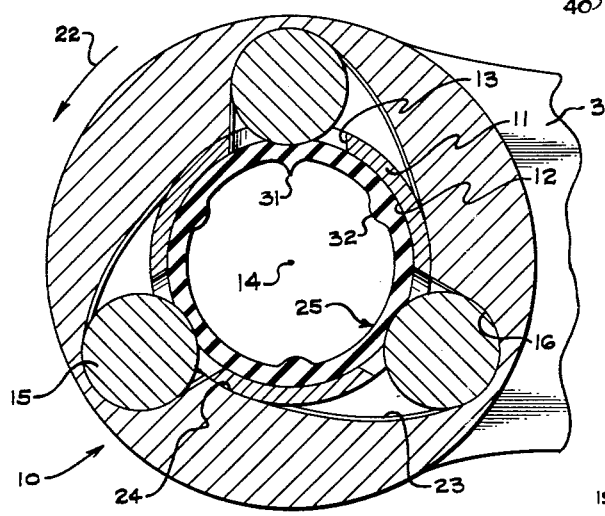
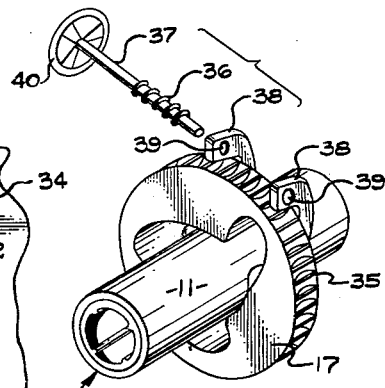
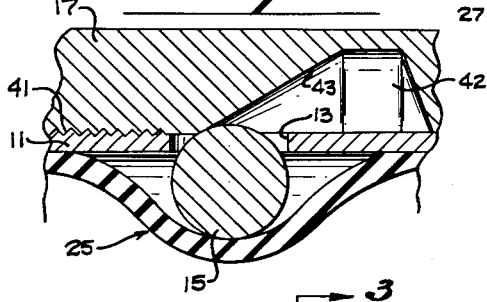
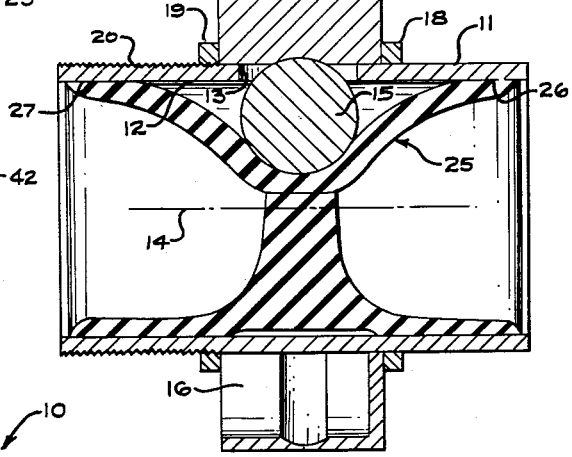
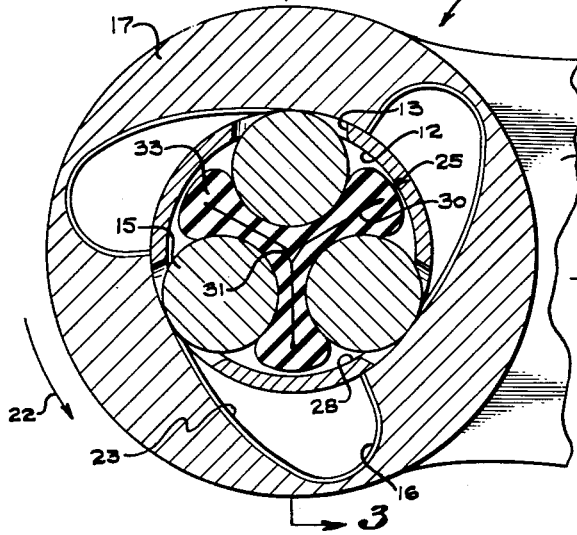
WILLIAM R. TESON
HOWARD W. BARKELL
INVENTORS
ATTORNEYS

United States Patent Office 2,987,292
Patented June 6, 1961

2,987,292
MECHANICALLY OPERATED COLLAPSIBLE VALVE
William R. Teson, 1134½ Via Wanda, No. 64, Long Beach, Calif., and Howard W. Barkell, 1807 Luray St., Long Beach 7, Calif.
Filed July 13, 1959, Ser. No. 826,781
9 Claims. (Cl. 251—6)

This invention relates generally to fluid flow valves, and more particularly concerns a novel valve characterized as being packingless, in that there are no clearances between relatively movable parts to which fluid has access during opening and closing of the valve, which clearances are ordinarily required to be sealed by appropriate packing.

In the handling of corrosive fluids such as in refineries and in the chemical industry it is sometimes desirable to keep the fluid out of contact with movable valve parts subject to corrosion. This is extremely difficult to accomplish where, during opening and closing of the valve, the fluid has access to the valve parts through small clearances which are formed even between mechanically pressure sealed components. Accordingly, efforts have been made in the past to construct valves in which such clearances are eliminated, by utilizing a flexible section of tubing which may be closed off or pinched off from the exterior as by the application of fluid pressure to the tubing outer surface. However, such packingless valves have been subject to difficulties brought about at least in part by the lack of positive mechanical closure of the flexible tubing effected in such a way as to insure, without chance of malfunction, the complete closure of the valve.

Accordingly, the present invention has for its major object the solution of the above mentioned difficulties through the provision of a valve in which a flexible bore liner is located within a fluid flow bore of a valve body, the liner being subject to complete and positive closure. As will be described in detail, the flexible bore liner extends across a side opening in the valve body to seal off access of fluid in the bore to the side opening. For effecting closure of the liner, insert means is provided at the outside of the opening, the insert means being movable through the opening to enter the bore and to displace the liner therein for reducing the fluid flow bore area, by actuator means movable relative to the body and the insert means at the exterior of the body side opening. The actuator means, which preferably includes a cam in engagement with the insert means, is movable as for example in rotation to positively cam the insert means inwardly and thereby effect positive displacement of the liner to reduce the fluid flow bore area, there being no possibility of malfunction in closure of the valve.

More specifically, multiple inserts are provided at the outside of multiple side openings in a tubular body spaced about the body axis. These inserts preferably comprise balls sized for simultaneous movement through the openings in response to displacement of an actuator sleeve relative to the tubular body and at the exterior thereof. In one form of the invention, the sleeve is rotatable about the tubular body axis to cam the balls inwardly from within interior recesses in the sleeve, whereas in another form of the invention the sleeve is advanced axially along the tubular body to cam the balls inwardly from within an annular recess in the sleeve. An important feature of the invention resides in the fact that the flexible liner is substantially fully supported at all times by the convex ball surfaces so as to prevent pressure blowout of the liner through the side openings in the tubular body. Also, the liner is bulged so as to completely fill the fluid flow bore area when the balls have entered the bore to the maximum extent.

These and other objects and advantages of the present invention, as well as the details of an illustrative embodiment, will be more fully understood from the following detailed description of the drawings in which:

FIG. 1 is a cross section through the valve in open condition;
FIG. 2 is a view similar to FIG. 1 but showing the valve in closed condition;
FIG. 3 is a view taken on line 3—3 of FIG. 2;
FIG. 4 is a perspective view of the valve exterior showing the use of a worm gear mechanism for opening and closing the valve; and
FIG. 5 is a fragmentary view showing a modified form of the valve.

In FIGS. 1 through 3 the valve 10 is shown to include a tubular body 11 having a fluid flow bore 12 and three side openings 13 symmetrically circularly spaced about the bore axis 14. While three side openings are preferred, it will be understood that a greater or lesser number may be provided. The side openings are approximately circular and are sized to pass circular cross section inserts shown in their preferred form as balls 15 located at the outsides of the openings as seen in FIG. 1, wherein the valve is open. The balls are retained in the valve open condition within recesses 16 formed within a sleeve 17 which is mounted for rotation about the tubular body 11. As seen in FIG. 3 the sleeve is axially retained between a pair of collars 18 and 19, the first typically being fixed on the tubular body 11, and the second collar being mounted on threads 20. It will be understood that the sleeve 17 may be locked in rotary position by tightening the collar 18 against the sleeve so as to frictionally engage the sleeve against collars 18 and 19. Other locking devices are of course usable as and for the purpose of locating the sleeve 17 in a rotary position with respect to the tubular body 11.

The sleeve 17 is adapted to be rotated in the direction of the arrow 22 for the purpose of closing the valve, and in this connection the recesses have cam shoulders 23 at their rearward sides with respect to the direction of rotation. These cam shoulders are angled to engage and urge the balls 15 inwardly through the side openings 13 for causing the balls to enter the bore 12, the balls in their innermost positions being shown in FIG. 2. As therein illustrated, the balls are retained in their innermost positions by engagement with the bore segments 24 of the sleeve intermediate the recesses 16.

A flexible bore liner, typically cylindrical, is shown generally at 25 in all views, the liner typically comprising rubber, and being peripherally sealed as by bonding to the bore 12 of the body 11 at the locations 26 and 27 spaced at axially opposite sides of the side openings 13. Alternatively, the liner may be held in place by a flanged coupling, as between pipe and valve body flanges. Thus, fluid within the valve cannot gain access to the side opening 13 or the balls 15, and the liner extends across the openings to seal off access of corrosive fluid thereto. In FIG. 1, the liner 25 is shown circumferentially supported by the bore 12 of the tubular body 11 and by the smoothly convex surfaces of the balls 15, there being only small gaps within the side openings 13 across which the liner is unsupported during valve open condition. Preferably, the interior edges 28 of the openings 13 are rounded or smooth so as to prevent gouging or cutting of the rubber liner 25 when the latter is pressed thereagainst by fluid pressure.

As the valve is closed the balls 15 displace the liner inwardly at symmetrical locations, causing increasing engagement of the convex surfaces of the balls with the exterior surface of the liner. When the valve is finally closed the liner cross section generally appears Y-shaped as viewed in FIG. 2, the balls transmitting pressure to the liner to close it across interfaces 30 also extending in Y-shaped configuration. This pressure transmission is positive and mechanical, there being no chance for the balls to move outwardly to result in opening of the valve in the absence of further rotation or counter-rotation of the sleeve 17.

Complete closure of the liner at the axis 14 is made possible by the provision of a liner bulge 31 in the form of a projection tapering inwardly toward the axis 14 and opposite one of the balls 15. As viewed in FIG. 2, the bulge 31 keys or matches the gap remaining at the axis 14 when the balls and liner are displaced inwardly to maximum extent. Additional inward bulges 32 located in the plane of the bulge 31 normal to the axis 14 are provided at locations intermediate the balls 15 so as to cause the formation of enlarged liner lobes 33 during inward displacement of the balls. The lobes in turn effect a more extensive engagement of the liner exterior surface with the balls 15 to insure maximum pressure transmission and sealing closure at the interfaces 30.

In FIGS. 1 and 2 a handle extension 34 of the sleeve is shown projecting outwardly away from the sleeve. It will be understood that the handle 34 may be grasped manually or may be otherwise actuated to rotate the sleeve 17, giving increased mechanical advantage for closing the valve. It will be further understood that complete closure of the valve shown in these views is effected by turning of the sleeve 17 through only ¼ of a turn, approximately.

In FIG. 4 the sleeve 17 has gear teeth 35 formed thereon for engagement with a worm 36 formed on a shaft 37. The latter is adapted to be supported by lugs 38 and to extend through openings 39 therein, the lugs being carried by the tube 11. Thus, rotation of the hand wheel 40 on the shaft 37 causes turning of the sleeve 17 for closing the valve with much increased mechanical advantage, depending of course upon the mechanical advantage derived from the worm gear arrangement. This makes possible fine control of the valve.

In FIG. 5 the sleeve 17 is in threaded engagement with the tube 11 at 41, so that as the sleeve is turned it advances axially relative to the tubing 11. The balls 15 are received in an annular recess 42 in the sleeve 17 when the valve is in open condition. As the sleeve 17 is rotated and thereby axially advanced, an annular cam surface 43 engages the balls and displaces them inwardly through the side openings 13 for closing the liner 25 as previously described.

We claim:

1. A valve, comprising a tubular body having an axially extending fluid flow bore and three side openings equally spaced about said bore, a flexible bore liner extending across said openings sealing off access of fluid in the bore to said openings, three inserts at the outside of said openings sized to enter said bore through said openings, said inserts having equal circular cross sections in planes normal to the bore axis and rotary actuator means including cam means rotatable in one direction about said tubular body in camming engagement with said inserts to cause said inserts to enter said bore simultaneously and to equal progressive extent and to displace said liner at three symmetrical locations therein for reducing the fluid flow bore area, said rotary actuator means being operable when rotation thereof is stopped to hold the inserts at any one of an infinite number of selected positions of equal progressive entrance into said bore, the curved surfaces of the inserts in the valve closed position positively holding said bore liner in Y-shaped cross sectional configuration and exerting compressive loading against opposite sides of the Y-arms of the bore liner when the inserts are fully entered into said body.

2. The invention as defined in claim 1 in which said inserts comprise balls.

3. The invention as defined in claim 2 in which said actuator cam means comprises a sleeve having three like recesses receiving said balls at the outside of said side opening, the recesses having walls which gradually diverge outwardly from the tubular body in the direction of forward rotation of said sleeve and then abruptly taper back toward the tubular body.

4. The invention as defined in claim 2 in which the diameter of each ball plus the thickness of said liner and less the through dimension of each opening is substantially equal to the bore radius.

5. The invention as defined in claim 2 in which said liner is circumferentially bonded to said tube bore at locations at axially opposite sides of said openings.

6. The invention as defined in claim 2 in which said liner is radially inwardly budged for cooperation with at least one ball to completely close the fluid flow bore area when said balls have entered said bore to maximum extent.

7. The invention as defined in claim 2 in which said rotary actuator means comprises a rotatably mounted member having gear teeth, and a worm in threaded engagement with said teeth, said worm being mounted on said tubular body.

8. The invention as defined in claim 2 in which said rotary actuator means comprises a sleeve freely rotatable about said tubular body.

9. The invention as defined in claim 2 including threads supporting said sleeve for axial advancement along and rotation about said tubular body.

References Cited in the file of this patent

UNITED STATES PATENTS

| | | |
|---|---|---|
| 492,580 | Hadley | Feb. 28, 1893 |
| 2,641,282 | Hazlett | Mar. 16, 1949 |

FOREIGN PATENTS

| | | |
|---|---|---|
| 179,527 | Switzerland | of 1935 |
| 59,025 | Norway | of 1938 |
| 745,844 | Great Britain | of 1956 |